United States Patent
Fought et al.

[11] Patent Number: 6,074,427
[45] Date of Patent: Jun. 13, 2000

[54] APPARATUS AND METHOD FOR SIMULATING MULTIPLE NODES ON A SINGLE MACHINE

[75] Inventors: Steven K. Fought, Madison, Wis.; Madhusudhan Talluri, Fremont; Declan J. Murphy, San Francisco, both of Calif.

[73] Assignee: Sun Microsystems, Inc., Mountain View, Calif.

[21] Appl. No.: 08/919,128

[22] Filed: Aug. 30, 1997

[51] Int. Cl.[7] ................................................ G06F 9/44
[52] U.S. Cl. .................... 703/21; 703/22; 703/23
[58] Field of Search .................. 395/500.42, 500.34, 395/180, 200.3, 200.53; 702/122; 703/21, 22, 23, 6

[56] References Cited

U.S. PATENT DOCUMENTS 5,671,352  9/1997  Subrahmaniam et al. .......... 395/183.17
5,805,867  9/1998  Kodaira ............................... 395/500.42
5,812,780  9/1998  Chen et al. ......................... 395/200.54

OTHER PUBLICATIONS

Rosenblum et al, "Using the SimOS Machine Simulator to Study Complex Computer Systems", ACM Transactions on Modeling and Computer Simulation, vol. 7 No. 1, pp. 78–103, Jan. 1997.

*Primary Examiner*—Kevin J. Teska
*Assistant Examiner*—Samuel Broda
*Attorney, Agent, or Firm*—Pennie & Edmonds LLP

[57] ABSTRACT

The present invention pertains to a system and method for simulating multiple clusters of independent computer nodes in a single machine. A cluster contains one or more computer nodes interconnected by a communications link. A user can simulate a cluster of n nodes by generating n user-level procedures where each user-level procedure represents the kernel of a respective node. An additional mechanism is provided which allows a user to exercise the operation of any intended function in any of the nodes in any of the clusters.

23 Claims, 4 Drawing Sheets

APPARATUS AND METHOD FOR SIMULATING MULTIPLE NODES ON A SINGLE MACHINE

The present invention relates generally to the simulation of parallel processing systems and particularly to the simulation of multiple kernel operating systems in a cluster processing environment.

BACKGROUND OF THE INVENTION

A current trend in the computer industry is the interconnection of a cluster of independent computing nodes connected by a high-speed communications link. Each node is associated with a number of domains, where each domain represents a process having its own address space. One such domain is the operating system or kernel that provides a single system image, making the cluster look like a single machine to the user, to applications, and to the network. This single system image allows user and kernel applications to invoke procedures without regard to where the procedures reside within the cluster. Thus, a user application running in one node can invoke an object whose method is located in another node of the cluster without requiring the user application to know the location of the invoked method.

Debugging the kernel in a cluster environment presents a number of challenges. Traditional debugging tools are not suitable since they require that the debugged code be stopped in order to examine data. When the debugged code is the kernel, the kernel will be stopped in order to examine kernel data. All processing in the node ceases when the kernel is stopped. In order to avoid this situation, the debugger needs to execute on a separate node. Often, this additional resource is not available.

In addition, certain kernel procedures can only execute on one node. In order to debug an cluster environment, n nodes or computers will be required. Often, these additional resources are scarce and not readily available.

Accordingly, there needs to be a mechanism that provides an efficient environment in which the cluster environment can be simulated for debugging purposes.

SUMMARY OF THE INVENTION

The present invention is an apparatus and method for simulating on a single computer multiple kernel procedures where each kernel procedure represents a node. The kernel procedures are simulated as user-level procedures thereby enabling a user to debug the kernel procedures.

The architecture that is simulated includes clusters of computer nodes interconnected by a communications link. Each cluster includes one or more independent computer nodes. Each node is associated with a number of domains, where each domain represents a process having its own address space. One such domain is the operating system or kernel that provides a single system image, making the cluster look like a single machine to the user, to applications, and to the network. This single system image allows for user or kernel applications to invoke procedures without regard to where the procedures reside within the cluster.

Each kernel utilizes a number of mechanisms to achieve the single cluster system image: a door mechanism is used for inter domain communication; an object request broker (ORB) is used to process object invocations; a gateway handler is used to interface with the ORB and the user-level domains; a transport mechanism is used to facilitate communication between the different nodes; a kernel module library is used to store kernel applications; and a cluster membership monitor procedure is used to monitor the operational status of each node in a cluster.

Each node's kernel is simulated as a user-level procedure. A mechanism is provided that allows a user to configure a simulation environment having a user-specified number of simulated nodes that form one cluster. If needed, multiple clusters can be simulated on the same machine. In addition, a user has the ability to select the functions that we simulated and in which node.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Simulated Cluster Architecture

Figure 1:
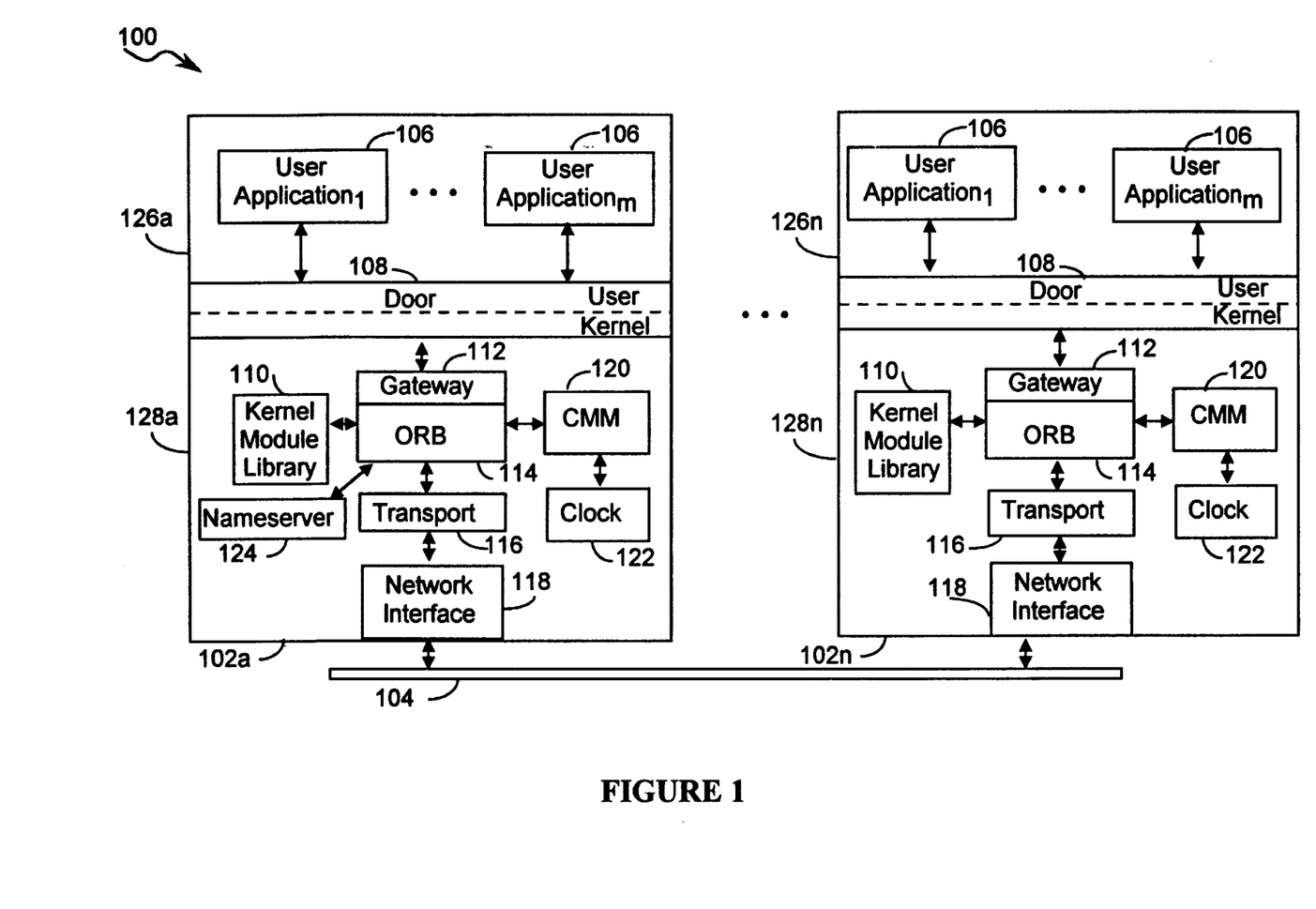
FIG. 1 is a block diagram of a computer system representing the simulated cluster environment.

Referring to FIG. 1, the is shown a computer system 100 representing one cluster of computing nodes 102. A cluster is a set of computing nodes. Each computing node 102 represents an independent computer that is interconnected via a communications link 104. It should be noted that the present invention has the capability to simulate one or more clusters. For illustration purposes only, a single cluster is illustrated in FIG. 1.

The communications link 104 generically refers to any type of wire or wireless link between computers, such as but not limited to a local area network a wide area network, or a combination of networks. The computing nodes 102 use the communications link 104 to communicate with each other. In one embodiment, the communications link can be a System Area Network (SAN).

Each node 102 has one or more domains 126, 128. A domain 126, 128 is defined to be a process with its own address space. A domain 126, 128 can have multiple threads of execution (usually called threads) that can execute user or kernel application procedures. A kernel domain 128 refers to the operating system and a user domain 126 refers to a process other than the operating system.

In a preferred embodiment, the operating system or kernel 128 is the Solaris MC operating system, which is a product of Sun Microsystems, Inc. Background information on th Solaris MC operating system can be found in "Solaris MC: A Multi-Computer OS," Technical Report SMLI TR-95-48, November 1995, Sun Microsystems, which is hereby incorporated by reference.

A user domain 126 typically executes one or more user application procedures 106. A user application procedure 106 can communicate with another procedure through a door mechanism 108. Typically, the user application procedure 106 can invoke objects without regard to where the object's method resides. A user application procedure 106 in one domain can invoke an object where the object's method resides in a different domain either in the same node or in a different node within the cluster.

A door or door mechanism 108 is an interprocess communication (IPC) mechanism that enables procedures in different domains to communicate with each other. The door mechanism is located in the user domain 126 and in the kernel domain 128. A user application procedure 106 in one domain can issue a call through a door 108 hat executes code in another domain. In a preferred embodiment, the Solaris door mechanism is used which is described in detail in Solaris 2.6 Reference Manual, distributed by Sun Microsystems, Inc., 1997 (http://docs.sun.com:80/ab2/≃DSCBrowse?reference=1) which is hereby incorporated by reference. However, the present invention is not limited to the door mechanism. Other IPC mechanisms can be used such as but not limited to sockets, Sun remote procedure calls (RPC) and System V IPC.

Briefly, a door 108 describes a procedure in a domain 126, 128 and can contain some associated state information. A domain that obtains a door 108 is free to pass it along with its capabilities to another domain in the cluster. A server creates a door for some service it provides and exports the door 108 to clients. Clients who obtain the door 108 may then invoke the service associated with the door 108 using the synchronous RPC semantics of a door call procedure.

During a door invocation the client procedure that issues the door call procedure migrates to the server domain associated with the door and executes the requested procedure while in the address space of the server. When the requested procedure is finished, a door return operation is performed and control migrates back to the client domain with the results, if any, from the procedure call.

One task of to kernel domain 128 is to facilitate communication between domains in different nodes 102. A request to execute a procedure in a different node can be received by the kernel 128 from a user or kernel procedure. The request is converted into a format that can be transmitted to the server node containing the requisite information needed by the server node to execute the requested procedure. Various procedures in the kernel are used to establish this communication protocol without any involvement by the requesting user or kernel application procedure. The various procedures used by the kernel to provide this communication are described below. A more detailed description of these procedures is found in pending patent application entitled, "A System and Method For Remote Object Invocation." Ser. No. 08/879,150, filed Jun. 19, 1997, and assigned to Sun Microsystems, Inc., which is hereby incorporated by reference.

The kernel 128 contains an ORB 114 which is used to process object invocations. In a preferred embodiment, the ORB 114 utilizes the architecture and the specification of the Common Object Request Broker Architecture (CORBRA). A more detailed description of CORBRA can be found in *The Common Object Request Broker: Architecture and Specification*. Object Management Group, Inc., Framingham, Mass., revision 2.0, July 1995, which is hereby incorporated by reference.

Requests to the ORB 114 can be from user-level and kernel-level application pods. The requests from the user-level application procedures 106 are transmitted to the ORB 114 through the door mechanism 108 to a gateway 112. A gateway or gateway handler 112 is an extension of the door mechanism 108 that performs several tasks in order to process object invocations.

In some cases, the object invocation is for an object's method that resides in a different node. In this case, the ORB 114 transforms an object invocation request into a logical message that is sent to an appropriate node 102 through a transport procedure 116. The transport procedure 116 processes messages to a node identified by a node identifier, determines a network address associated with the node identifier, and calls the network interface 118 to deliver the message. The transport procedure 116 can utilize any of the well-known "transport layers" communication protocols such as but not limited to, transmission control protocol (TCP), user datagram protocol (UPD), or the like. Furthermore, the ORB 114 can receive messages from another node through the transport procedure 116.

A kernel module library 110 includes a number of executable modules that can be dynamically loaded upon request. The modules 110 perform kernel-level tasks. The modules 110 include the kernel-level applications, as well as other procedures. The kernal application procedures utilize the ORB 114 to process object invocations.

A cluster membership monitor (CMM) procedure 120 is provided to detect a node failure. The CMM procedures 120 in each node communicate with each other at regular intervals to determine the operational status of the nodes in the cluster. Communication is performed at a precise time interval which is initiated by an interrupt from a software clock procedure 122. The CMM procedure 120 informs the ORB 114 when a node failure occurs and when a failed node becomes operational.

One of the nodes 102a in each cluster is designated a root node since it contains a nameserver procedure 124. The nameserver 124 is used to identify the various objects resident in the cluster. The ORB 114 uses the nameserver 124 to determine the location of the object's methods.

The forgoing has described the cluster environment and infrastructure that will be simulated. Attention now turns to the manner in which the cluster environment is simulated.

Simulation Environment

Figure 2:
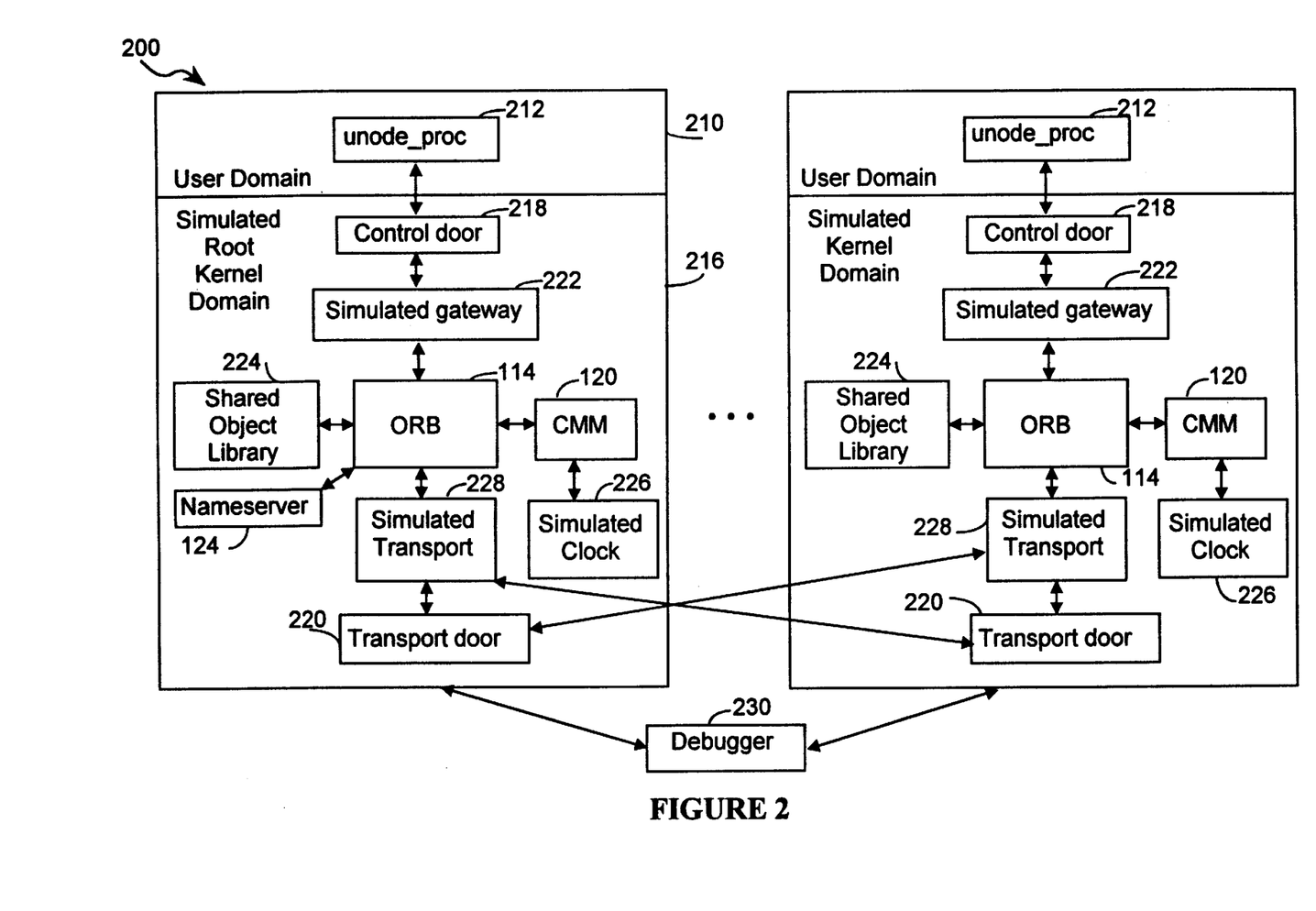
FIG. 2 is a block diagram of a simulation environment for the computer system shown in FIG. 1.
Figure 3:
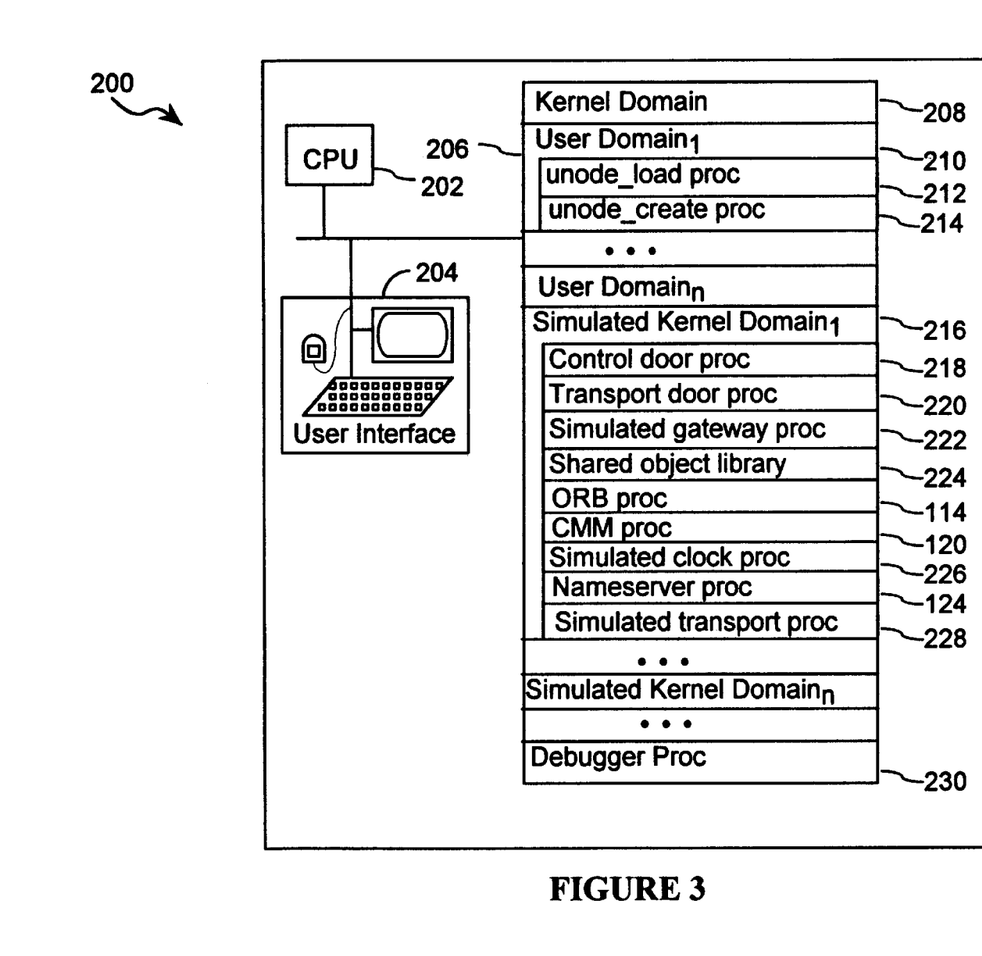
FIG. 3 is a block diagram of the computer system embodying the simulation environment of the present invention.

FIGS. 2 and 3 illustrate the simulated clusters. A single computer 200 can be used to simulate one or more clusters of computing nodes. The kernel of each node represents, in essence, the heart of each node. Each kernel is represented as a user-level domain and is herein referred to as a simulated kernel domain 216. In addition, the computer 200 has a kernel 208, one or more user domains 210, and a debugger 230. By representing a node as a user-level domain, the debugger 230 can be used to debug the simulated kernel domains 216 without interrupting the operation of the kernel 208. In addition, the simulated clusters can be achieved using a single computer rather than multiple computers.

The computer 200 can be a workstation, personal computer, mainframe or any type of processing device. The computer 200 includes a CPU 202, a user interface 204, and a memory 206. The computer 200 has other system resources which are not shown. The memory 206 of the computer 200 may be implemented as RAM (random access memory) or a combination of RAM and non-volatile memory such as magnetic disk storage. The memory 206 can include the kernel domain 208, one or more user domains 210, one or more simulated kernel domains 216, a debugger procedure 230, as well as other data and procedures.

A user domain 210 can include a unode_load procedure 212 and a unode_create procedure 214. The unode_load procedure 212 is used to execute procedures in a simulated kernel domain 216. The unode_create procedure 214 is used to create one or more simulated kernel domains 216. The operation of both these procedures will be described below.

A simulated kernel domain 216 includes the following procedures: a control door or control door procedure 218, a transport door or transport door procedure 220, a simulated gateway or simulated gateway procedure 222, one or more shared object libraries 224, an ORB procedure 114, a CMM procedure 120, a simulated clock or simulated clock procedure 226, and a simulated transport or simulated transport procedure 228. In one particular simulated kernel domain 216, there is a nameserver or nameserver procedure 124.

A kernel is dependent on the inputs from the underlying hardware. As such, not all of the kernel procedures can be made to execute as a user-level procedure. Thus, some of the kernel procedures were replaced by simulated procedures and others required minor modifications to make them executable as a user-level procedure.

The ORB procedure 114, nameserver procedure 124, and CMM procedure 120 are basically the same procedures that reside in the kernel domain. They have been slightly modified in order to become a user-level domain by performing syntax changes and to like to certain functions internal to these procedures. For example, the kernel uses the procedure thread_create( ) with a certain number of arguments to create new threads. In the simulated kernel, this same function is called thr_create( ) and takes a different number of arguments.

A control door 218 is associated with each simulated kernel domain 216 and is used to facilitate communication to the user domains 210. The control door 218 is linked to a simulated gateway 222 that accepts a command string specifying a particular function to execute in the simulated kernel domain 216 and its arguments. The simulated gateway 222 accepts this command string and loads the requested function from the object library 224. It then converts the commands into arguments recognizable by the function and executes the function with the arguments. The function in turn can invoke the methods of one or more objects which are processed by the ORB 114.

Executable modules in the simulated kernel domains 216 are represented as shared objects that are stored in a shared object library 224. The shared objects represent user-level and kernel-level applications and services that are used to simulate the functioning of the kernel for debugging purposes. A shared object is characterized by a module name and a function name.

Communication between the simulated kernel domains 216 is achieved through the use of a simulated transport procedure 228 and a transport door 220. The simulated transport procedure 228 can receive an instruction from the ORB 114 to transmit a message to another simulated kernel domain 216. This request can be to execute an object's method that resides in another simulated kernel domain 216 or to perform another task. The simulated transport procedure 228 determines the transport door 220 associated with the recipient simulated kernel domain 216. The simulated transport procedure 228 then performs a door call to the recipient simulated kernel domain 216. This transfers control to the intended simulated kernel domain 216 which performs the requested processing. When the processing is completed, a reply is returned to the requesting simulated kernel domain 216 by performing a door return operation. Control is then transferred to the simulated kernel domain 216 of the requesting node which processes the response.

In addition, the simulated transport procedure 228 and transport door 220 can be used to transmit cluster related messages between the simulated kernel domains 216 of a cluster for other purposes. For example, communication between the CMMs of each simulated kernel domain 216 within a cluster utilizes the simulated transport procedure 228 and trans door 220. This communication is achieved through messages that are routed via the transport door 200. The simulated transport procedure 228 is used to convert the messages from one format to another format recognizable to an intended recipient and to direct the message to an intended recipient.

A simulated clock procedure 226 is provided to replace the kernel clock 122. The simulated clock procedure 226 is used to generate timely clock interrupts to the CMM procedure 120 which enables it to monitor the status of the simulated kernel domains 216 in a cluster. In one embodiment, the simulated clock procedure 226 executes as a real time thread in the Sun Solaris operating system.

A debugger procedure 230 is provided which can be used to debug the execution of the simulated kernel domains 216.

The foregoing has described the mechanisms used to simulate the cluster environment. Attention now turns to the steps used to simulate the operation of the kernels in each node of the clusters.

Figure 4:
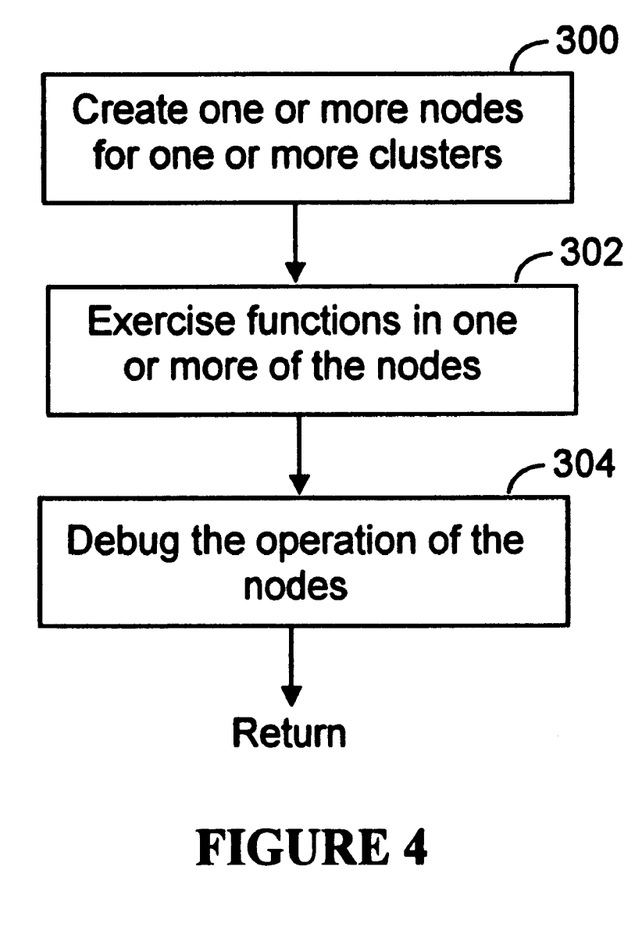
FIG. 4 is a flow chart illustrating the steps used to generate the simulated environment and the use of the simulated environment.

Referring to FIG. 4, initially, a user generates one or more nodes associated with one or more clusters (step 300). This is accomplished by calling a unode_create procedure 214 which generates a simulated kernel domain 216 representing a particular node in a particular cluster. The unode_create procedure 214 takes a number of arguments such as the name of the cluster, an identifier of the node, and the number of nodes in the cluster. The unode_create procedure 214 establishes a control door 218 and a transport door 220 for the simulated kernel domain and performs other initialization tasks as well. Once the simulated kernel domains are created they operate in a like manner as the real system kernels and communicate with each other.

Next, a user domain can execute a particular function in a simulated kernel domain (step 302). This is accomplished by executing a unode_load procedure 212 that exercises a function in a particular simulated kernel domain 216. The unode_load procedure 212 can be embedded in a user application procedure. The unode_load procedure 212 specifies that a particular simulated kernel domain 216 execute a particular function stored in a shared object library 224. The unode_load procedure 212 is called from a user domain 210 with the following arguments: the name of the cluster, the node identifier, the name of a module in the shared object library 224, a name of a function in the module that will be executed, and the function's arguments.

The unode_load procedure 212 uses the cluster name and node identifier to determine the corresponding control door procedure 218. The unode_load procedure 212 then invokes a door call using the control door procedure 218 which transfers control along with the arguments to the simulated gateway 222 associated with the intended simulated kernel domain 216. The unode_load procedure 212 passes to the simulated gateway 222 the name of the module, the name of the function in the module, and the function's arguments. The simulated gateway 222 determines the name of the shared object representing the module and dynamically loads in the corresponding shared object if it has not already been loaded into memory 206. The simulated gateway 222 unpacks the arguments and converts them into a format that is recognizable by the function which is then executed.

The function can then execute a number of tasks which can involve communicating with other simulated kernel domains 216. In this case, the ORB 114 is utilized which communicates with the other simulated kernel domains 216 through the simulated transport procedure 116 and the transport door 220.

When the function completes execution, a reply is returned to the unode_load procedure 212 that requested execution of the function. The reply is transmitted in one format from the function to the simulated gateway 222. The simulated gateway 222 then converts the reply into a format recognizable by the unode_load procedure 212 and executes a door return operation to transmit the reply to the unode_load procedure 212.

While the simulated kernel domain 216 is executing, a debugger 230 can be used to analyze the execution of the code running in the simulated kernel domain 216 (step 304). Debugging is well known in the art and the present invention is not limited to any particular type of debugging technique. In one embodiment, the debugger can execute one or more simulated kernel domains. The debugger can halt execution of a simulated kernel domain in order to analyze memory locations and data values.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIGS. 1–3. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. An apparatus for simulating a cluster of independent computer nodes, said apparatus comprising:
   a plurality of user-level non-simulated domains, each user-level domain having a distinct address space and having one or more user-level procedures; and
   a plurality of user-level simulated kernel domains, each user-level simulated kernel domain having a distinct address space and providing a capability to simulate a kernel operating system, each user-level simulated kernel domain including:
      at least one executable procedure;
      a gateway handler procedure receiving a request to execute a select one of the executable procedures and executing the select executable procedure; and
      a first interprocess communication mechanism providing communication between a select one of the user-level simulated kernel domains and the user-level domains;
   wherein the user-level domains utilize the first interprocess communication mechanism to request execution of a particular one of the executable procedures in a particular user-level simulated kernel domain.

2. An apparatus for simulating a cluster of independent computer nodes, said apparatus comprising:
   a plurality of user-level domains, each user-level domain having a distinct address space and having one or more user-level procedures; and
   a plurality of user-level simulated kernel domains, each user-level simulated kernel domain having a distinct address space and providing a capability to simulate a kernel operating system, each user-level simulated kernel domain including:
      at least one executable procedure;
      a gateway handler procedure receiving a request to execute a select one of the executable procedures and executing the select executable procedure; and
      a first interprocess communication mechanism providing communication between a select one of the user-level simulated kernel domains and the user-level domains;
   wherein the user-level domains utilize the first interprocess communication mechanism to request execution of a particular one of the executable procedures in a particular user-level simulated kernel domain;
   each user-level simulated kernel domain includes a plurality of object methods; and
   each user-level simulated kernel domain includes an object request broker (ORB) that receives a request from the select executable procedure to invoke a specified object method.

3. An apparatus for simulating a cluster of independent computer nodes, said apparatus comprising:
   a plurality of user-level domains, each user-level domain having a distinct address space and having one or more user-level procedures; and
   a plurality of user-level simulated kernel domains, each user-level simulated kernel domain having a distinct address space and providing a capability to simulate a kernel operating system, each user-level simulated kernel domain including:
      at least one executable procedure;
      a gateway handler procedure receiving a request to execute a select one of the executable procedures and executing the select executable procedure; and
      a first interprocess communication mechanism providing communication between a select one of the user-level simulated kernel domains and the user-level domains;
   wherein the user-level domains utilize the first interprocess communication mechanism to request execution of a particular one of the executable procedures in a particular user-level; simulated kernel domain; and
   a subset of the user-level simulated kernel domains represent a cluster;
   the apparatus further comprising a communications membership monitor procedure that monitors an operational status of each of the user-level simulated kernel domains associated with a particular cluster.

4. The apparatus of claim 3, further comprising:
   a clock procedure, that at a predefined time interval, notifies the communications membership monitor to monitor the operational status of each of the user-level simulated kernel domains associated with the cluster.

5. The apparatus of claim 1, further comprising:
   a debugger mechanism for debugging operations of any specified one of the plurality of user-level simulated kernel domains.

6. The apparatus of claim 1, further comprising:
a first procedure for generating one or more of the user-level simulated kernel domains.

7. The apparatus of claim 1, further comprising:
a second interprocess communication mechanism for handling communications between the user-level simulated kernel domains.

8. A computer-implemented method for simulating a cluster of computing nodes, the method comprising the steps of:
providing a plurality of user-level domains, each user-level domain including one or more user applications;
providing a plurality of user-level simulated kernel domains, each user-level simulated kernel domain representing a select one of the computing nodes, each user-level simulated kernel domain including a first interprocess communication (IPC) mechanism for communicating with the user-level domains and a particular one of the user-level simulated kernel domains, a plurality of executable procedures, and an gateway handler for executing an executable procedure;
obtaining a request from a specific user-level domain to execute an executable procedure in a select one of the user-level simulated kernel domains;
determining a first IPC mechanism associated with the select user-level simulated kernel domain;
utilizing the first IPC mechanism associated with the select user-level simulated kernel domain to transmit the request to a gateway handler associated with the select user-level simulated kernel domain; and
executing the requested executable procedure in the select user-level simulated kernel domain.

9. The method of claim 8, said step of providing a plurality of user-level simulated kernel domains further comprising the steps of:
generating one or more user-level simulated kernel domains; and
associating with each user-level simulated kernel domain a cluster identifier and a node identifier; and
providing each user-level simulated kernel domain with a second IPC mechanism that provides a communication path between one or more of the user-level simulated kernel domains, the second IPC mechanism using the cluster identifier and the node identifier.

10. The method of claim 8, further comprising the step of:
debugging an execution of the requested executable procedure in any specified one of the plurality of user-level simulated kernel domains.

11. The method of claim 8, further comprising the steps of:
associating a subset of the user-level simulated kernel domains with a particular cluster; and
providing each user-level kernel domain with a communications membership monitor (CMM) mechanism that monitors an operational status of each user-level simulated kernel domain associated with a particular cluster at predefined time intervals.

12. The of claim 11, further comprising the step of:
notifying the CMM mechanism when the predefined time intervals occurs.

13. The method of claim 8,
wherein the executable procedures includes a plurality of shared objects referenced by a module name and a function name.

14. The method of claim 13,
said executing step further comprising the steps of:
determining a module name associated with the requested executable procedure;
dynamically loading the module associated with the module name into memory; and
invoking the function associated with the requested executable procedure.

15. The method of claim 8, further comprising the steps of:
obtaining a reply from the executed procedure; and
transmitting the reply to the requesting user-level domain.

16. The method of claim 8, further comprising the steps of:
providing an object request broker (ORB) mechanism to invoke methods associated with one or more objects referenced by the requested executed procedure.

17. A computer program product for use in conjunction with a computer system, the computer program product comprising a computer readable storage medium and a computer program mechanism embedded therein, the computer program mechanism comprising:
a plurality of user-level non-simulated domains, each user-level domain having a distinct address space and having one or more user-level procedures; and
a plurality of user-level simulated kernel domains, each user-level simulated kernel domain having a distinct address space and providing a capability to simulate a kernel operating system, each user-level simulated kernel domain including:
at least one executable procedure;
a gateway handler procedure receiving a request to execute a select one of the executable procedures and executing the select executable procedure; and
a first interprocess communication mechanism providing communication between a select one of the user-level simulated kernel domains and the user-level domains;
wherein the user-level domains utilize the first interprocess communication mechanism to request execution of a particular one of the executable procedures in a particular user-level simulated kernel domain.

18. A computer program product for use in conjunction with a computer system, the computer program product comprising a computer readable storage medium and a computer program mechanism embedded therein, the computer program mechanism comprising:
a plurality of user-level domains, each user-level domain having a distinct address space and having one or more user-level procedures; and
a plurality of user-level simulated kernel domains, each user-level simulated kernel domain having a distinct address space and providing a capability to simulate a kernel operating system, each user-level simulated kernel domain including:
at least one executable procedure;
a gateway handler procedure receiving a request to execute a select one of the executable procedures and executing the select executable procedure; and
a first interprocess communication mechanism providing communication between a select one of the user-level simulated kernel domains and the user-level domains;
wherein the user-level domains utilize the first interprocess communication mechanism to request execution of a particular one of the executable procedures in a particular user-level simulated kernel domain;

each user-level simulated kernel domain includes a plurality of object methods; and each user-level simulated kernel domain includes an object request broker (ORB) that receives a request from the select executable procedure to invoke a specified object method.

19. A computer program product for use in conjunction with a computer system, the computer program product comprising a computer readable storage medium and a computer program mechanism embedded therein, the computer program mechanism comprising:

a plurality of user-level domains, each user-level domain having a distinct address space and having one or more user-level procedures; and a plurality of user-level simulated kernel domains, each user-level simulated kernel domain having a distinct address space and providing a capability to simulate a kernel operating system, each user-level simulated kernel domain including:

at least one executable procedure;

a gateway handler procedure receiving a request to execute a select one of the executable procedures and executing the select executable procedure; and a first interprocess communication mechanism providing communication between a select one of the user-level simulated kernel domains and the user-level domains;

wherein the user-level domains utilize the first interprocess communication mechanism to request execution of a particular one of the executable procedures in a particular user-level simulated kernel domain;

a subset of the user-level simulated kernel domains represent a cluster;

the computer program product includes a communications membership monitor procedure that monitors an operational status of each of the user-level simulated kernel domains associated with a particular cluster.

20. The computer program product of claim 19, further comprising:

a clock procedure, that at a predefined time interval, notifies the communications membership monitor to monitor the operational status of each of the user-level simulated kernel domains associated with the cluster.

21. The computer program product of claim 17, further comprising:

a debugger mechanism for debugging operations of a any specified one of the plurality of user-level simulated kernel domains.

22. The computer program product of claim 17, further comprising:

a first procedure for generating one or more of the user-level simulated kernel domains.

23. A computer program product for use in conjunction with a computer system, the computer program product comprising a computer readable storage medium and a computer program mechanism embedded therein, the computer program mechanism comprising:

a plurality of user-level domains, each user-level domain having a distinct address space and having one or more user-level procedures; and a plurality of user-level simulated kernel domains, each user-level simulated kernel domain having a distinct address space and providing a capability to simulate a kernel operating system, each user-level simulated kernel domain including:

at least one executable procedure;

a gateway handler procedure receiving a request to execute a select one of the executable procedures and executing the select executable procedure; and a first interprocess communication mechanism providing communication between a select one of the user-level simulated kernel domains and the user-level domains;

wherein the user-level domains utilize the first interprocess communication mechanism to request execution of a particular one of the executable procedures in a particular user-level simulated kernel domain;

the computer program product further comprising a second interprocess communication mechanism for handling communications between one or more of the user-level simulated kernel domains.

* * * * *